US00RE35415E

United States Patent [19]

Takami

[11] E Patent Number: Re. 35,415

[45] Reissued Date of Patent: Dec. 31, 1996

[54] CAMERA HAVING AN AUTOMATICALLY OPERATED BUILT-IN STROBE

[75] Inventor: Satoshi Takami, Tokyo, Japan

[73] Assignee: Asahi Kogaku Kogyo Kabushiki Kaisha, Tokyo, Japan

[21] Appl. No.: 511,720

[22] Filed: Aug. 7, 1995

Related U.S. Patent Documents

Reissue of:

[64] Patent No.: 5,122,829
Issued: Jun. 16, 1992
Appl. No.: 592,986
Filed: Oct. 4, 1990

U.S. Applications:

[63] Continuation of Ser. No. 202,204, Feb. 25, 1994, abandoned.

[30] Foreign Application Priority Data

Oct. 6, 1989 [JP] Japan ..... 1-261810
Oct. 19, 1989 [JP] Japan ..... 1-272365

[51] Int. Cl.[6] ..... G03B 15/05

[52] U.S. Cl. ..... 396/165; 396/472; 396/201; 396/176

[58] Field of Search ..... 354/419, 238.1, 354/237, 127.1, 288, 465, 149.1, 149.11, 402

[56] References Cited

U.S. PATENT DOCUMENTS

| | | | |
|---|---|---|---|
| Re. 29,599 | 3/1978 | Ogawa | 354/419 X |
| 4,084,167 | 4/1978 | Iwata | 354/145.1 X |
| 4,472,042 | 9/1984 | Iwata et al. | 354/419 X |
| 4,523,827 | 6/1985 | Masunaga et al. | 354/402 X |
| 4,545,667 | 10/1985 | Niwa et al. | 354/419 |
| 4,847,647 | 7/1989 | Ueda | 354/149.1 |
| 4,868,592 | 9/1989 | Suzuki et al. | 354/400 |
| 4,893,140 | 1/1990 | Yamamoto et al. | 354/149.11 |
| 4,910,542 | 3/1990 | Yamamoto et al. | 354/149.11 |
| 4,920,368 | 4/1990 | Arai et al. | 354/145.1 |
| 5,038,165 | 8/1991 | Amanuma et al;. | 354/402 |
| 5,134,433 | 7/1992 | Takami et al. | 354/419 |
| 5,142,465 | 8/1992 | Sato | 354/149.11 |
| 5,150,140 | 9/1992 | Kitazawa | 354/149.11 |
| 5,361,120 | 11/1994 | Takami | 354/419 |

FOREIGN PATENT DOCUMENTS

| | | |
|---|---|---|
| 0308625 | 3/1989 | European Pat. Off. . |
| 3219242 | 1/1983 | Germany . |
| 3639751 | 5/1987 | Germany . |
| 3844143 | 7/1989 | Germany . |
| 63-148928 | 9/1988 | Japan . |
| 2058377 | 4/1981 | United Kingdom . |
| 2058378 | 4/1981 | United Kingdom . |
| 2183857 | 6/1987 | United Kingdom . |

OTHER PUBLICATIONS

Pp. 74 and 75 of the Dec. 1988 issue of the Japanese publication *Shashin Kogyo.*
English language translation of German Office Action dated Sep. 11, 1992.
United Kingdom Search Report.
United Kingdom Examiner's Report.

*Primary Examiner*—W. B. Perkey
*Attorney, Agent, or Firm*—Greenblum & Bernstein P.L.C.

[57] ABSTRACT

A strobe incorporated camera having a strobe light emitter which emits strobe light, a light emitter driving mechanism which moves the light emitter between a retracted position in which the light emitter is retracted in a camera body and an operative position in which the light emitter emits the strobe light, a photometering device for obtaining an exposure factor when a first switch is turned ON, and an exposure device for performing a predetermined exposure when a second switch is turned ON. The camera includes a strobe judging device for determining whether the strobe should be used, in accordance with the exposure factor, and a strobe controller for moving the strobe light emitter to the operative position when the strobe judging device determines that the strobe should be used when the first switch or the second switch is turned ON.

26 Claims, 7 Drawing Sheets

CAMERA HAVING AN AUTOMATICALLY OPERATED BUILT-IN STROBE

Matter enclosed in heavy brackets [ ] appears in the original patent but forms no part of this reissue specification; matter printed in italics indicates the additions made by reissue.

*This application is a continuation of reissue application Ser. No. 08/202,204, filed Feb. 25, 1994, now abandoned, which is a reissue application of application Ser. No. 07/592,986, now U.S. Pat. No. 5,122,829.*

BACKGROUND OF THE INVENTION

1. Field of the Invention

The present invention relates to a camera having a strobe incorporated therein, which has a light emitter that is movable between a retracted position and an operative position (i.e., light emitting position).

2. Description of the Related Art

Cameras having automatic light modulation type strobes has increased in number, because of its easy handling. A strobe incorporated camera having a strobe control apparatus is also known, in which a light emitter of the strobe is supported by a supporting mechanism, so as to move between a retracted position in which the light emitter is retracted in the camera body and an operative position, i.e., a light emitting position, in which the light emitter projects outward from the camera body by an electrical driver (e.g., an electrically driven motor).

In such a known strobe incorporated camera, the control of strobe light emission is usually effected in accordance with exposure factors, such as brightness data of an object to be taken or calculated shutter speed data. Namely, when the object brightness is below a predetermined value, the light emitter is brought to the operative position to emit strobe light. After the strobe light is emitted, the light emitter is returned to the retracted position. Conversely, if the object brightness is above a predetermined value, the light emitter is kept in the retracted position, since no strobe light is necessary.

In the conventional camera mentioned above, whether the strobe should be used or not is determined in accordance with data detected by a photometer when a release button is pushed down by a half step (or, depressed halfway). If it is determined that the strobe should be used, the light emitter is moved to the operative position (i.e., light emitting position) to emit the strobe light. Accordingly, the light emitter is moved whenever the brightness is below a predetermined value, regardless of the filming (exposing), which is however troublesome.

Furthermore, upon self-timer photographing, whether or not the strobe should be used is determined at the commencement of the self-timer operation. Consequently, if it is determined that the strobe should be used, the light emitter is moved to the operative position, so that the light is emitted to expose, when the set time is up. This, however, causes a problem in that the detected brightness no longer corresponds to the actual brightness upon exposure.

There is also known a single-lens reflex camera having a retractable strobe incorporated therein, further including an automatic focusing device which has an auxiliary light emitting element provided in the light emitter for emitting a contrast pattern and a so-called passive photometering means (i.e., means for calculating the amount of defocus). In this automatic focusing single-lens reflex camera, the light emitter is moved to the operative position to cause the auxiliary light emitting element to emit the contrast pattern onto the object to be taken when the brightness is below a predetermined value, so that the automatic focusing operation, such as a detection of an object distance, is performed, based on the contrast pattern of light reflected by the object.

However, in such a strobe incorporated single-lens reflex camera, if self-timer photographing is effected, the photometering operation and the detection of the object distance are effected at the commencement of the self-timer operation. Accordingly, if the object moves thereafter, the object is "out of focus".

SUMMARY OF THE INVENTION

The primary object of the present invention is to eliminate the above mentioned drawbacks by providing a strobe that is incorporated in a camera in which the movement of the light emitter, the photometering, and the detection of the object distance can be effected at an optimum time.

To achieve the above mentioned object, according to the present invention, there is provided a strobe incorporated camera having a strobe light emitter which emits strobe light, a light emitter driving mechanism which moves the light emitter is retracted in a camera body, and an operative position, in which the light emitter emits the strobe light, a photometering means for obtaining an exposure factor when a first switch is turned ON, and an exposure means for performing a predetermined exposure when a second switch is turned ON, wherein said camera comprises means for determining whether the strobe should be used, in accordance with the exposure factor obtained by the photometering means, and a strobe control means for moving the light emitter to the operative position when the strobe determining means determines that the strobe should be used and when the first switch or the second switch is turned ON.

With this arrangement, even if the strobe determining means determining that the strobe should be used, the light emitter is moved to the operative position only when the second switch is turned ON.

According to another aspect of the present invention, the camera has a normal photographing mode and a self timer photographing mode, wherein the photometering means operates, to calculate the exposure factor immediately before the exposure operation and after the self timer operation starts when the camera is in the self timer photographing mode.

Preferably, the strobe determining means determines whether the strobe should be used in accordance with the exposure factor at the self timer photographing mode.

Preferably, the strobe control means operates to move the light emitter to the operative position when the strobe determining means determines that the strobe should be used in the self timer photographing mode.

This makes it possible to realize a more accurate exposure in accordance with the object brightness, immediately before the exposure.

BRIEF DESCRIPTION OF THE DRAWINGS

The invention will be described below in detail with reference to the accompanying drawings, in which.

DESCRIPTION OF THE PREFERRED EMBODIMENTS

The following discussion will be directed to preferred embodiments of the present invention.

Figure 1:
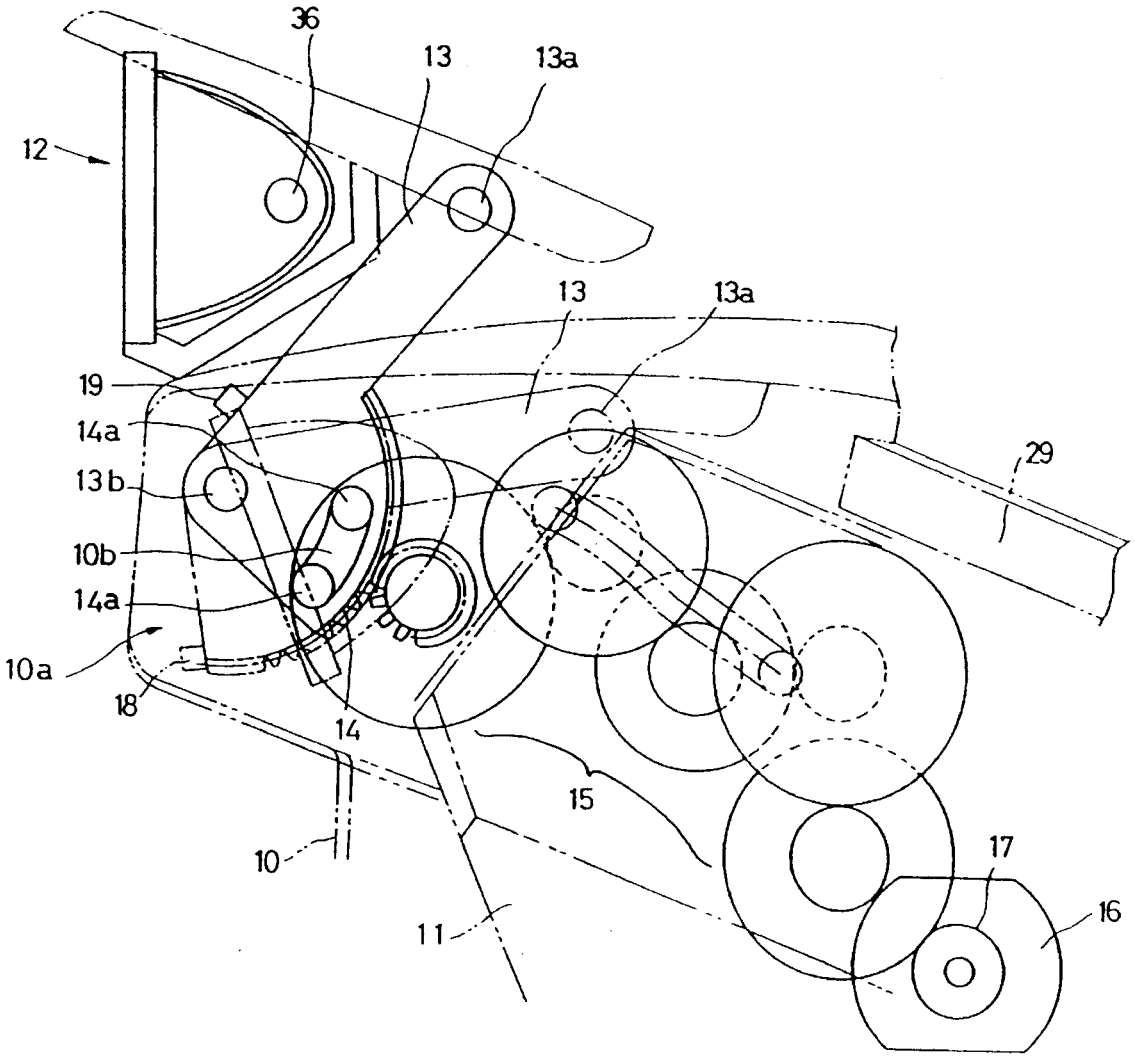
FIG. 1 is a schematic view of a strobe light emitter and the surroundings thereof in an automatic focusing single lens reflex camera having a strobe incorporated therein, to which the present invention is applied.
Figure 2:
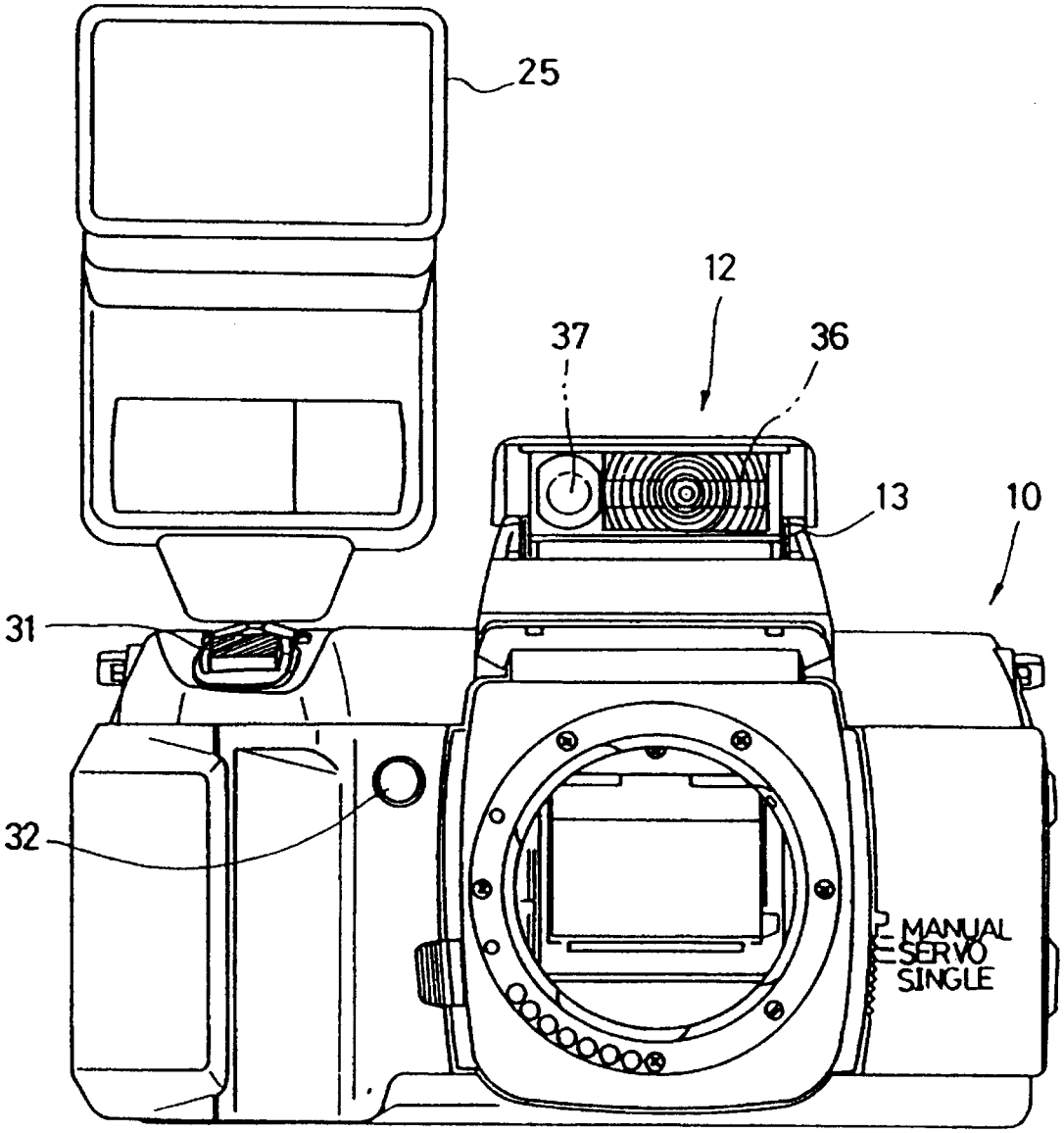
FIG. 2 is a front elevational view of a camera shown in FIG. 1, with an external strobe attached thereto, shown in an operative position in which the light emitter of an incorporated strobe projects outward from the camera body.

In FIGS. 1 and 2, camera body 10 is provided, on its upper portion (pentagonal prism 11), with a strobe light emitter 12 which is supported by a supporting mechanism so as to move between a retracted position, shown as an imaginary line in which light emitter 12 is retracted in a receiving portion 10a of the camera body 10, and an operative position (i.e., light emitting position), shown as a solid line in which the light emitter 12 protrudes from the receiving portion 10a. Note that only levers 13, which constitute a supporting mechanism, are shown in FIG. 1.

Each lever 13 is pivotted at its one end to a rear end of the light emitter 12 through a shaft 13a and at its opposite end to a side wall of the receiving portion 10a provided in the camera body 10 through a shaft 13b One of the levers 13 has a sector gear 14 having a center located on the center axis of the shaft 13b. The sector gear 14 is in mesh with a pinion 17 of a strobe motor 16, which constitutes a driving means through a gear train 15. Consequently, the rotation of the strobe motor 16 is transmitted on the levers 13 through the gears 17, 15 and 14, so that the strobe light emitter 12 is moved between the retracted position and the operative position through the levers 13, in accordance with the direction of the rotation of the strobe motor 16.

The sector gear 14 has a pin 14a provided thereon, which is fitted in an arched groove 10b that has a center that is coaxial to the shaft 13b, formed in the camera body 10. Pin 14a and the arched groove 10b restrict the angular displacement of the sector gear 14. Namely, the terminal angular positions of the levers 13 in the opposite directions are defined by the engagement of the pin 14a with the opposite ends of the arched groove 10b. The terminal angular positions correspond to the operative position and the retracted position of the light emitter 12.

Between the levers 13 and the camera body 10 are two limit switches 18 and 19 which are turned ON and OFF when the light emitter 12 comes to the retracted position and the operative position, respectively. The strobe motor 16, which is controlled by a camera control circuit 20 is stopped when the states of the limit switches 18 and 19 change.

In the illustrated embodiments, an overload detecting circuit of the strobe motor 16 is provided to detect an overload condition, such as is produced, for example, when the movement of the emitter 12 is intercepted by an external force or the like, to stop the strobe motor 16. The overload detecting circuit is contained in camera control circuit 20, (FIG. 3) in the illustrated embodiment. Alternatively, it is possible to stop the strobe motor 16 when the overload detecting means detects that no further rotation of the levers 13 occurs due to the abutment of the pin 14a with the terminal ends of the arched groove 10b.

Figure 3:
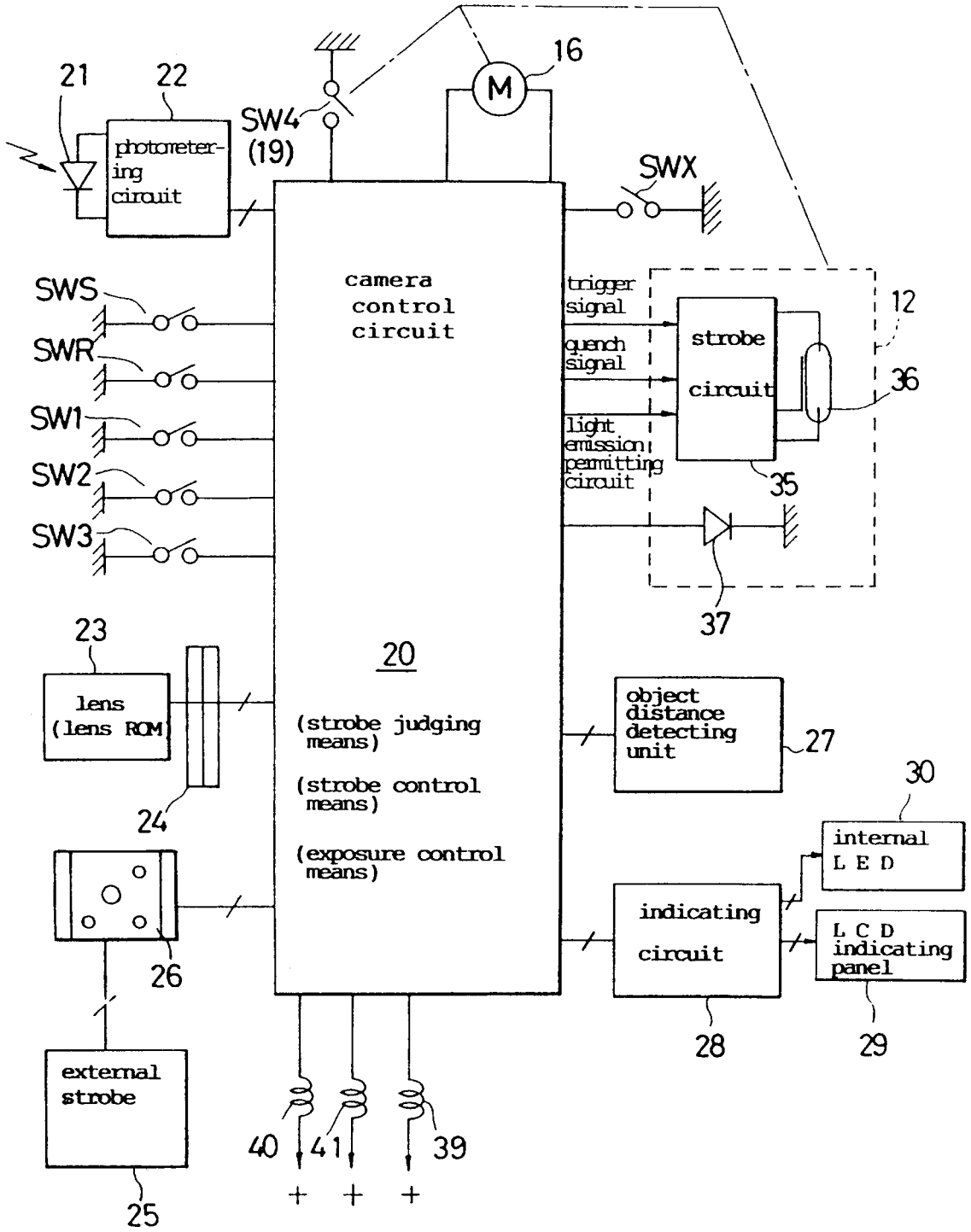
FIG. 3 is a block diagram schematically showing a circuit arrangement of the single-lens reflex camera shown in FIG. 1.

The following discussion will be addressed to the circuit arrangement of the strobe control apparatus, according to the present invention, with reference to FIG. 3.

Camera control circuit 20, which controls the whole operations of the camera, usually comprises a microcomputer. The camera control circuit 20 is connected to a photometering circuit 22, which amplifies and logarithmically compresses the output of photometering sensor 21, which receives the object light to process into predetermined photometer signals.

The camera control circuit 20 calculates the exposure factors (e.g., object brightness, shutter speed Tv, diaphragm value, camera-shake limit shutter speed, etc.) in accordance with a predetermined algorithm, based on data, such as film sensitivity data and the photometer signals output from the photometering circuit 22. The camera control circuit 20, the photometering sensor 21 and the photometering circuit 22 constitute a photometering means.

The camera control circuit 20 reads lens data issued by a lens ROM 23 (or CPU) provided in a photographing lens attached to the camera body in accordance with a serial communication. Based on the lens data that is read, the kind of lens attached to the camera body, a focal length of the lens, a minimum diaphragm value and an open diaphragm value thereof, etc., can be obtained. Note that the camera control circuit 20 serves as a lens data input means. The serial communication is carried out through an electrical connection of a plurality of contacts provided on a mount 24.

Hot shoe contacts are connected to the camera control circuit, are connected to which an external strobe 25 can be detachably attached. In the case where the external strobe 25 having a commnication function, strobe data is input from the external strobe 25 to the camera control circuit 20 through the hot shoe 26. The strobe data includes, for example, data which determines whether the external strobe is adaptable to the camera body 10, that is; whether the external strobe interferes with the upward movement of the light emitter 12 and whether strobe charging is completed, and the guide number. On the other hand, light emission permitting signals, trigger signals and quench signals are inputted to the external strobe 25 from the camera control circuit 20.

A photometer unit 27 includes a photometer sensor which converts the two-divided object image focused by the photographing lens to an electrical signal and outputs a photometering signal necessary for detection of the object distance (i.e., amount of defocus). The camera control circuit 20 calculates the amount of defocus in accordance with the photometering signal and the lens data to perform an AF (Automatic Focusing) process for driving a focusing lens of the photographing lens to the focal position through an AF mechanism. The AF process, per se, is known, as disclosed for example in U.S. Pat. No. (4,868,592).

An LCD panel 29 is provided on an outer face of the camera body 10, while an internal LED 30 is provided in a finder field of view. The indication of the LCD panel 29 and the LED 30 is controlled by the camera control circuit 20 through an indication circuit 28. In the illustrated embodiment, the LCD panel 29 and the LED 30 indicate at least the permission and prohibition of the light emission of the strobe and the warning of the use of the strobe, etc. Of course, it is possible to indicate other information on pertaining to the photographing function of the camera, such as exposure modes shutter speed, diaphragm value, and "out of focus" and "in focus", etc.

Various switches are connected to the camera control circuit 20, including: a photometer switch (i.e, first switch) SWS, a release switch (i.e., second switch) SWR, a timer switch SW1, a light emission selecting switch SW2, an improper lens releasing switch SW3 and an upward movement detecting switch SW4, etc.

The photometer switch SWS and the release switch SWR are associated with the release button 31, so that when the release button is depressed halfway, the photometer switch SWS is turned ON, and when the release button is fully depressed, the release switch SWR is turned ON. When the photometer switch SWS is turned ON, the photometering circuit 22 and the object distance detecting unit 27, etc., begin operating. When the release switch SWR is turned ON, the operation is changed to the release operation.

The self timer switch SW1 operates the self timer, so that when the self timer switch SW1 is turned ON, the operating mode of the camera mode becomes a self timer mode, in which, when the release switch SWR is turned ON, the self timer operation starts and the release operation starts a predetermined time thereafter.

The light emission selecting a switch SW2 changes the light emission mode of the strobe. When the light emission selecting switch SW2 is turned OFF, the judgement whether the strobe light should be emitted in accordance with the brightness data of the object detected by the photometering circuit 22 and the lens data read by the ROM 23 is effected at an automatic light emission mode. Conversely, when the light emission selecting switch SW2 is turned ON, the strobe light emission is compulsively controlled at a compulsive light emission mode. In the compulsive light emission mode, when the calculated shutter speed is higher than the strobe synchronous speed, the camera control circuit 20 sets the shutter speed, upon releasing, to be identical to the strobe synchronous speed.

The improper lens releasing switch SW3 selects whether the lens data read by the lens ROM 23 should be utilized to determine the strobe light emission. The improper lens releasing switch SW3 is actuated, for example, when the strobe light should be compulsively emitted, in spite of the angle of view of the attached lens being larger than the strobe illumination angle.

The upward movement detecting switch SW4 is turned ON when the light emitter 12 of the strobe, shown in FIG. 1, is fully moved up to the light emitting position. It should be appreciated that the upward movement detecting switch SW4 and the limit switch 19 can comprise a single switch.

A strobe circuit 35, which causes the strobe (i.e., light emitting tube 36) to emit strobe light, and an auxiliary light emitting LED 37 located adjacent to the light emitting tube 36 are connected to the camera control circuit 20. The camera control circuit 20 outputs an light emission permitting signal, the trigger signal and the quench signal to the strobe circuit 35. The camera control circuit 20 serves as a strobe control means.

The light emission permitting signal permits light to be emitted when the necessary conditions for emitting the strobe light are satisfied, so that the incorporated and external strobes commence the preparatory operations for the light emission, such as strobe charging, upon receipt of the light emission permitting signal.

The trigger signal comprises a signal for emitting strobe light. The quench signal comprises a signal for stopping the light emission when the amount of light by the strobe reaches an optimum value. The auxiliary light emitting LED 37 emits a contrast pattern onto the object to assist the measurement of the object distance by the object distance measuring unit 27 when the object brightness or contrast is small.

A release magnet 39 is connected to be the camera control circuit 20, which releases a mechanical charge of a mirror and shutter curtains (i.e., a leading curtain and a trailing curtain) when the release switch SWR is turned ON, and leading and trailing curtain magnets 40 and 41, which engage with the leading curtain magnets 40 and 41, which engage with the leading curtain and trailing curtain in place of the mechanical engagement and sequentially release the engagement thereby, to move the leading and trailing curtains so as to obtain a desired shutter speed, respectively.

An X contact switch SWX comprises a switch for emitting the strobe light from the conventional external strobe which has a lesser function (i.e., no communication function) and is turned ON after the movement of the leading curtain ends to emit the strobe light from the external strobe through the hot shoe 26.

Figure 4A:
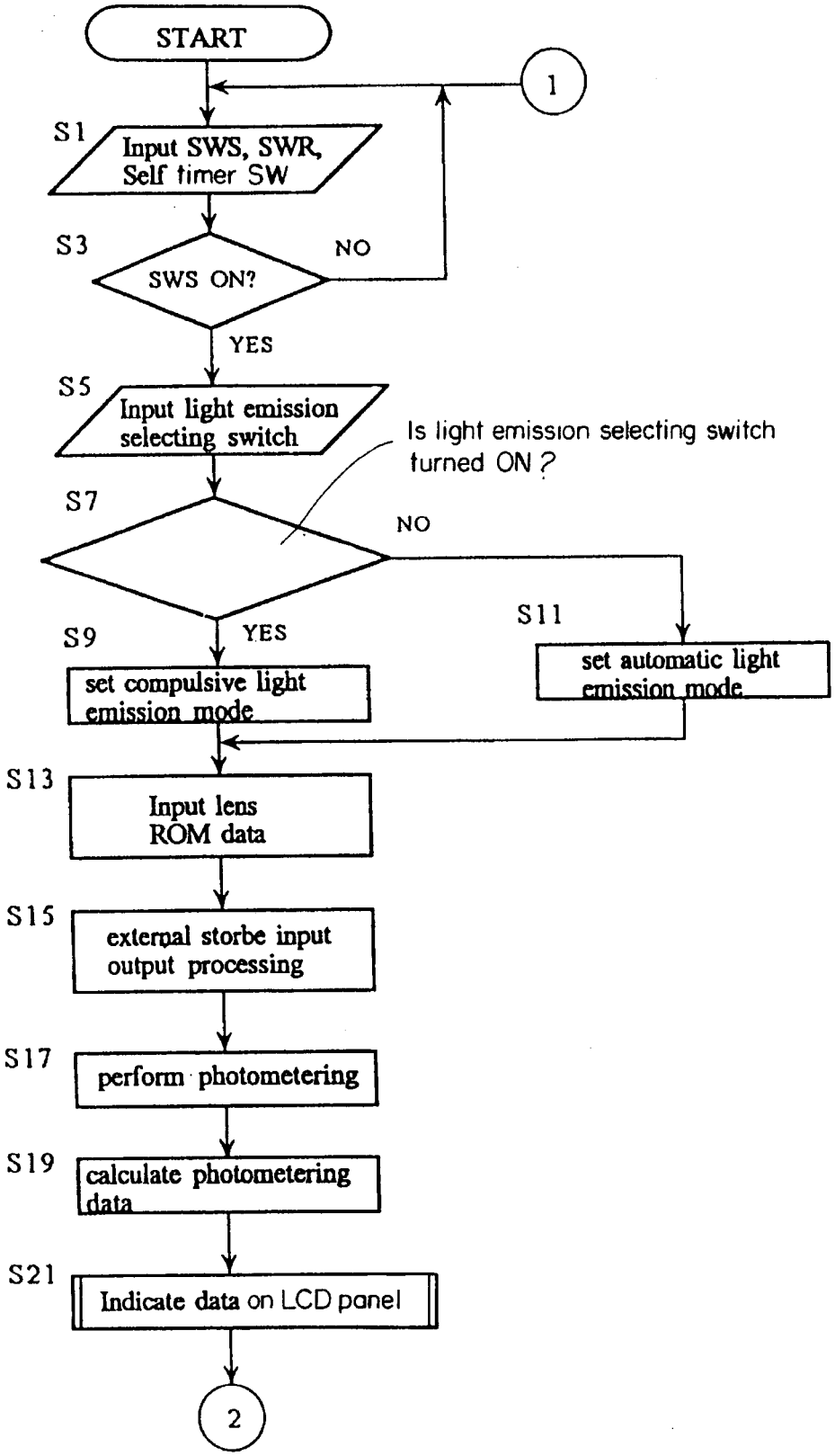
FIGS. 4A, 4B and 4C are flow charts illustrating operations of the single-lens reflex camera shown in FIG. 1; and, FIG. 5 is a flow chart of an indicating operation of the single-lens reflex camera shown in FIG. 1.
Figure 4B:
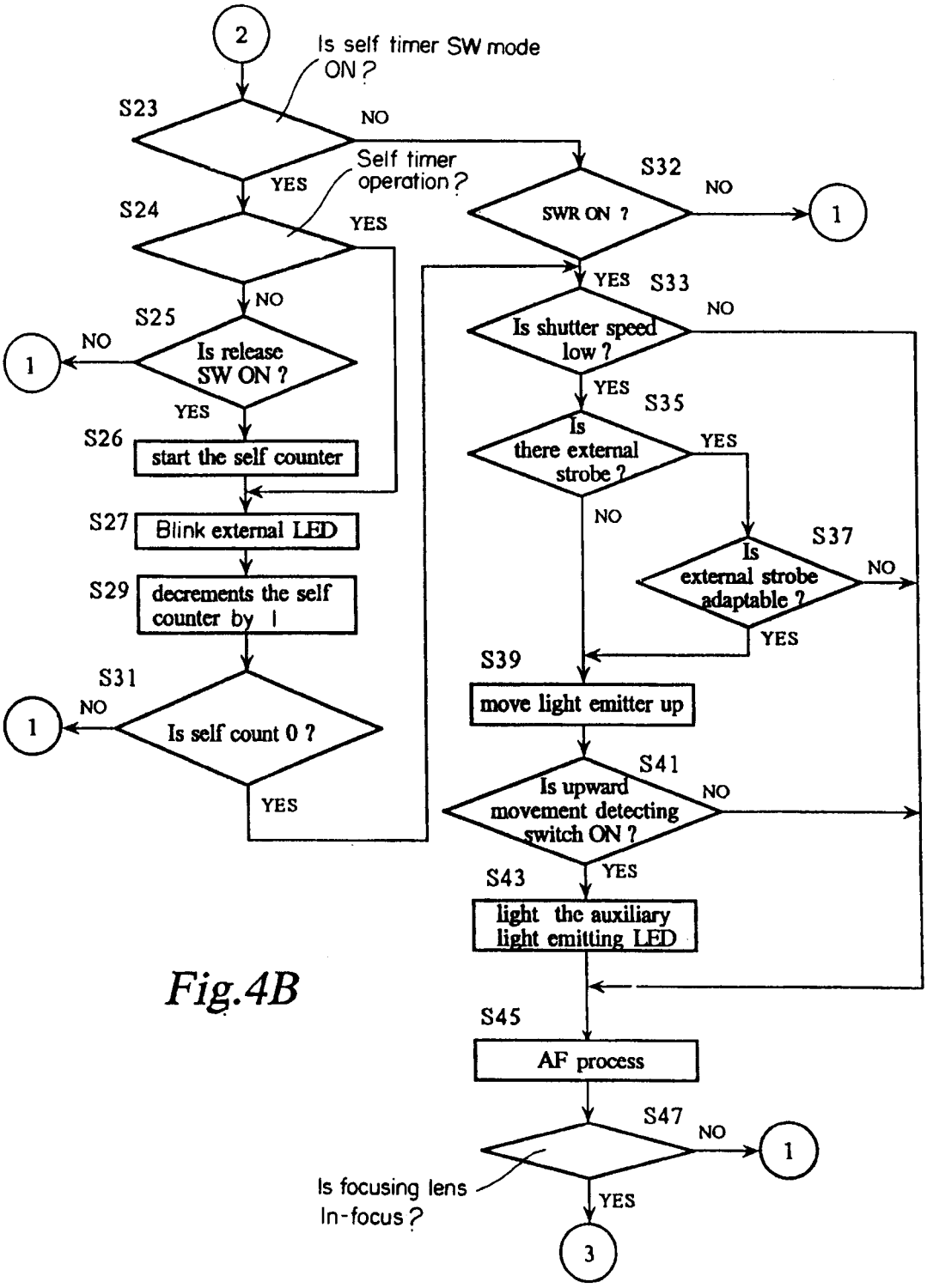
Figure 4C:
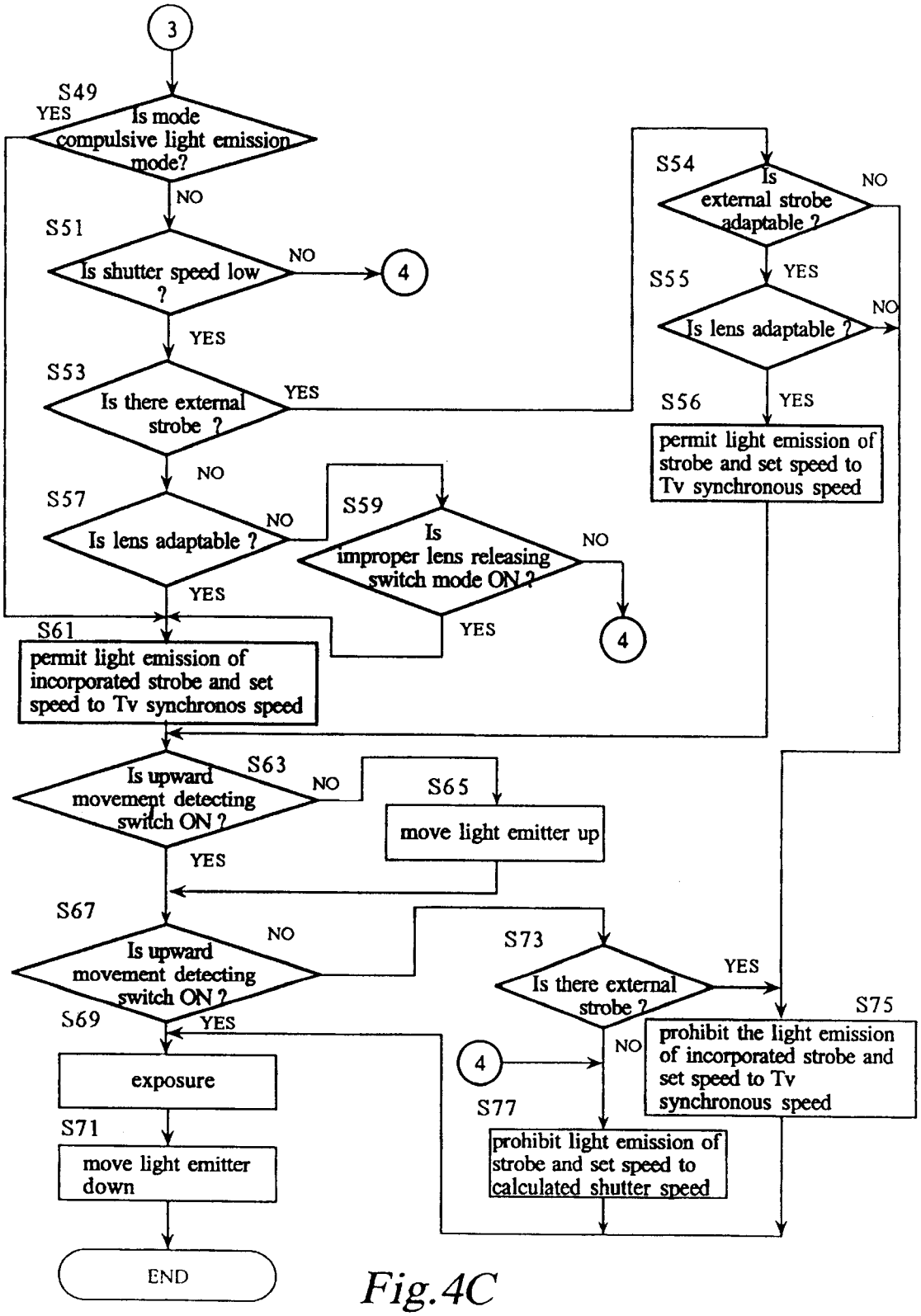
Figure 5:
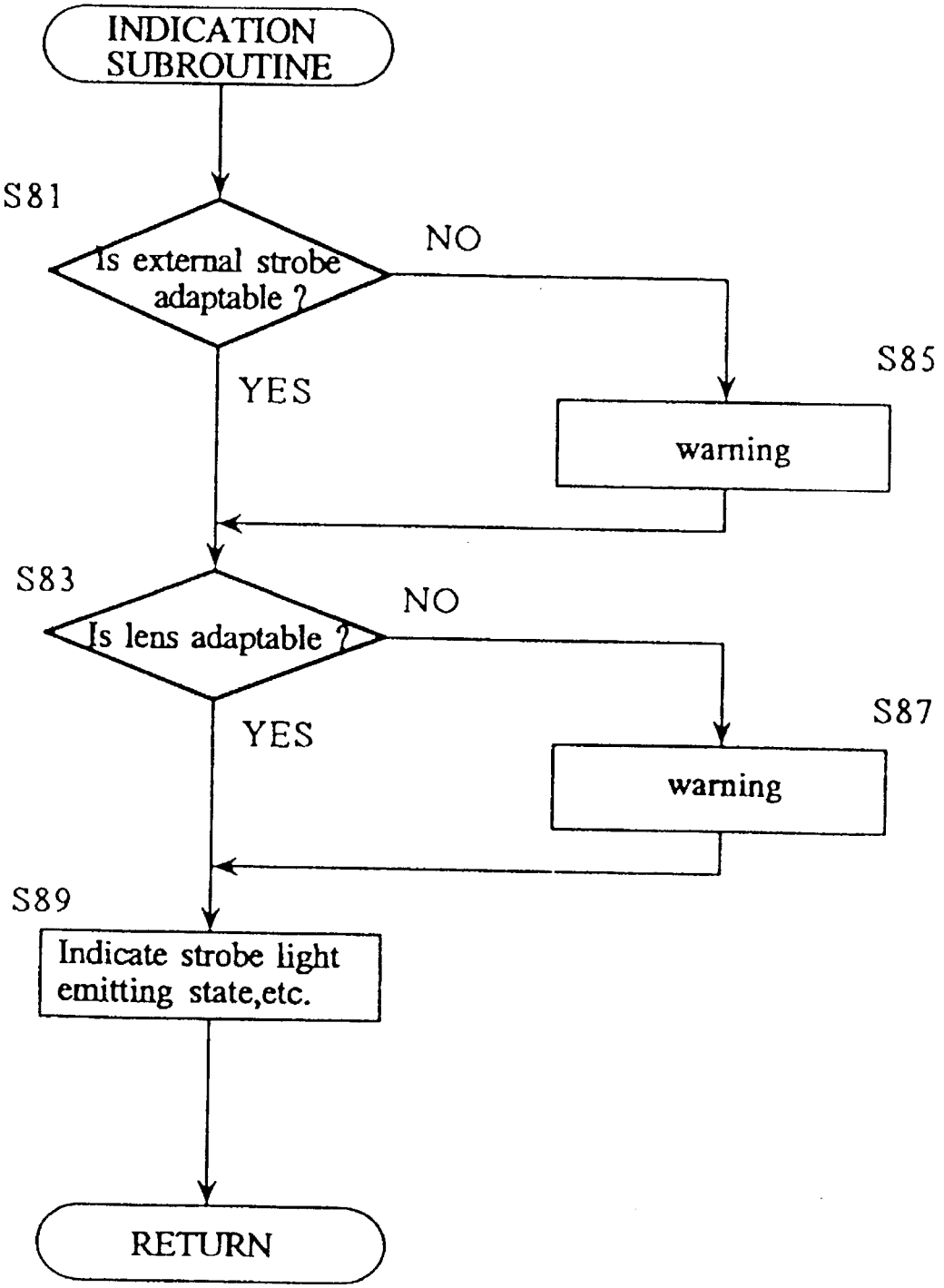

The strobe control apparatus of a camera of the present invention, as constructed above operates as follows (FIGS. 4 and 5).

The general operation of the apparatus will be first briefly explained below.

In the strobe control apparatus of the invention, when the calculated shutter speed is below a predetermined value (e.g.; camera-shake limit shutter speed), resulting in the need for auxiliary light by the strobe, the photographing lens attached to the camera is adaptable to the strobe and when the release switch SWR is turned ON, the light emitter 12 is moved up to the operative position to emit the light and then is moved down to the retracted position upon the completion of the light emission.

In the case of the compulsive light emission, when calculated shutter speed is higher than the strobe synchronous speed, the shutter speed is set to the strobe synchronous speed.

When the improper lens releasing switch SW3 is turned ON, the strobe control mentioned above is performed only in accordance with the detected object brightness, regardless of the kind of photographing lens attached to the camera. Thereafter, whether or not the strobe light can be emitted, namely, whether the property of the attached photographing lens meets the property of the strobe, and whether the external strobe 25 is adaptable are indicated in the LCD panel 29 provided on the camera body 10.

A more detailed explanation of the operation of the control apparatus of the present invention will now be given below with reference to the flow charts shown in FIGS. 4 (i.e., FIGS. 4A, 4B and 4C) and 5. Note that the operation is performed in accordance with a program stored in a memory of the microcomputer of the camera control circuit 20.

When the program starts under the condition that a picture can be taken, for example, by actuating a main switch, the camera control circuit 20 inputs the respective switch data (ON or OFF) of switches SWS, SWR and SW1 at step S1 and waits until the photometer switch SWS is turned ON (step S3).

If the photometer switch SWS is turned ON, the switch data of the light emission selecting switch SW2 is inputted to the microcomputer (steps S5 and S7). If the light emission selecting switch SW2 is turned ON, the strobe light emission mode is changed to the compulsive light emission mode (step S9). If the light emission selecting switch SW2 is OF, the strobe light emission mode is changed to the automatic light emission mode (step S11). If the strobe light emission mode is the compulsive light emission mode, the shutter speed upon releasing is set to the strobe synchronous speed at which the shutter speed is synchronous with the light emission of the strobe, so that the strobe emits the light upon releasing. On the other hand, if the mode is the automatic light emission mode, the strobe light is emitted only when it is determined that the strobe light is necessary, in accordance with the control mentioned below.

Thereafter, the camera control circuit 20 reads the lens data stored in lens ROM 23 (step S13). The lens data memorized in the lens ROM 23 includes information on the kind of lens, the focal length of the lens, etc.

Signal transmission is effected between the camera body and the external strobe 25 through the hot shoe 26 (step S15). The data from the external strobe 25 includes the characteristics thereof, such as whether the external strobe 25, when attached to the camera body 10, interferes with the upward movement of the light emitter 12 toward the operative position, the guide number of the strobe, etc. When an external strobe having no communication function is attached to the camera body, the attachment of the external strobe is detected in accordance with the signal level of the electrical contacts of the hot shoe 26.

The camera control circuit 20 calculates the exposure factors, such as a shutter speed, in accordance with the photometer signal outputted from the photometering circuit 22, and the film sensitivity data, etc., at steps S17 and S19. Thereafter, the camera control circuit 20 causes the LCD panel 20 to indicate the various values set in the camera through the indicating circuit 28 (step S21). The indicated information includes the strobe light emission mode.

Thereafter, the self timer switch SW1 is checked to determine whether the mode is the self timer mode at step S23. If the mode is the self timer mode, the operation of the self timer operation is checked at step S24. If the operation is not the self timer operation, the release switch SWR is checked to determine whether it is ON (step S25). If the release switch SWR is turned ON, the self counter starts; that is, the timer operation starts (step S26). The operation under the self timer mode is indicated by the blinking of the external LED 32 (FIG. 3) and the decrement of the self counter (steps S27 and S29).

Thereafter, whether the self counter becomes 0 is checked at step S31. If the counter is not 0, control is returned to step S1 to repeat the above mentioned operations. If the counter is 0, the control proceeds to step S33. At step S24, if the self timer operation has already commenced, the control skips to step S27 to continue the self timer operation. Even at in the self timer mode, if the release switch SWR is not turned ON, control is returned from step S25 to step S1.

Conversely, if the mode is not the self timer mode, that is, if the mode is a normal photographing mode, control proceeds to step S32 from step S23 to check whether the release switch SWR is turned ON. If the release switch SWR is OFF control is returned to step S1 to repeat the operations of steps S1~S23 and S32. If the release switch SWR is ON, control proceeds to step S33.

AT step S33, the calculated shutter speed is checked to determine whether it is below a predetermined value (e.g., camera-shake limit speed). If the calculated shutter speed is not below a predetermined value, control skips to step S45 (AF process), since neither the main strobe light emission nor the auxiliary strobe light emission are necessary.

Conversely, if the calculated shutter speed is below a predetermined value, it is determined whether the external strobe is attached (Step S35). If no external strobe is attached, control proceeds to step S39 to perform the process for moving the light emitter 12 upward to the operative position. If an external strobe is attached, whether the properties thereof meet the associated camera is checked (step S37). If the external strobe meets the camera requirements, control is returned to step S39, while if the external strobe does not meet the camera requirements, control skips to step S45. The term "meet" referred to herein means that the external strobe does not interfere with the upward movement of the light emitter 12 to the operative position.

At step S39, the process for moving the light emitter upward is performed. As a result, if the upward movement detecting switch SW4 is turned ON, that is, if the light emitter 12 comes to the operative position, the auxiliary light emitting LED 37 is illuminated (step S43) and control proceeds to step S45 (AF process). If the upward movement detecting switch SW4 is not turned ON at step S37, control proceeds to the AF process (Step S45) since no light emission can be effected.

At step S45, the object distance is detected through the object distance detecting unit 27, so that the AF process in which the focusing lens (not shown) of the photographing lens is moved to the focal position in accordance with the detected object distance (amount of defocus). Thereafter it is determined, whether the focusing lens is focused at step S47. If the focusing is finished, control proceeds to step S49. Conversely, if no focusing is achieved at step S47, control is returned to step S1 to repeat the above mentioned operations, until the focusing lens is moved exactly to the focal position.

The operations of step S1~S23, S24~S31, S33~S47 and S1 are repeated until the object is "in-focus" after the self counter becomes 0 at the self timer mode. On the other hand, in the normal photographing mode, the loop operations of Steps S1~S23, S32~S47 and S1 are repeated until the object is "in-focus" after the release switch SWR is turned ON. Note, that although the above discussion has been directed to a focus priority mode, in the case of a release priority mode, the control proceeds to step S49 from step S47, regardless of the lens being "in-focus".

At step S49, whether the mode is the compulsive light emission mode is checked. If the mode is the compulsive light emission mode, control skips to step S61, since the incorporated strobe is expected to emit the strobe light, regardless of the kind of photographing lens and the existence of the external strobe. If the mode is not the compulsive light emission mode, control proceeds to step S51.

At step S51, the calculated shutter speed is checked to determine whether it is below a predetermined value. If the calculated shutter speed is not below a predetermined value, control skips to step S77 to prohibit the emission of the strobe light and set the shutter speed upon releasing to be identical to the calculated shutter speed, since no strobe light is necessary. Thereafter, control proceeds to step S69 to perform the exposure.

If the calculated shutter speed is below a predetermined value, the external strobe is checked to determine whether it is attached (step S53). If the external strobe is attached, it is determined whether the external strobe meets the camera requirements is checked step (step S54). If the external strobe does not meet the camera requirements, since the light emitter 12 can not move to the operative position, control skips to step S75 to prohibit the light emission of the incorporated strobe and to set the shutter speed upon releasing to be identical to the strobe synchronous speed. Thereafter, control proceeds to step S69 to perform the exposure.

If the external strobe meets the camera requirements, it is determined whether the property of the attached photographing lens meets the property of the incorporated strobe (step S55). If the property of the attached photographing lens does not meet the property of the incorporated strobe, control proceeds to step S75 to prohibit the light emission of the incorporated strobe, since even if the strobe light is emitted, no object is correctly illuminated with the strobe light. Conversely, if the property of the attached photographing lens meets the property of the incorporated strobe, control proceeds to step S56 to permit the light emission of the incorporated strobe and set the shutter speed upon releasing to be identical to the strobe synchronous speed. Thereafter, control proceeds to step S63.

If the external strobe is not attached at step S53, it is determined whether the incorporated photographing lens meets the camera requirements (step S57). If the incorporated photographing lens meets the camera requirements, control proceeds to step S61. If the incorporated photographing lens does not meet the camera requirements, control proceeds to step S59 to check whether the improper lens releasing switch SW4 is turned ON. If the improper lens releasing switch SW4 is OFF, control proceeds to step S77, since no incorporated strobe emits the strobe light. Conversely, if the improper lens releasing switch SW4 is ON, control is returned to step S61 to emit the strobe light of the incorporated strobe.

At step S61, the light emission of the incorporated strobe is permitted and the shutter speed upon releasing is set to be identical to the strobe synchronous speed. Thereafter, it is determined whether or not the upward movement detecting switch SW4 is turned ON, that is, whether the light emitter 12 comes to the operative position (step S63). If the strobe light emitter 12 is not moved to the operative position, the strobe motor 26 is driven to move the light emitter up to the operative position (step S65). Thereafter, it is determined once more whether the upward movement detecting switch SW4 is turned ON (step S67).

If the upward movement detecting switch SW4 is ON, the exposure is performed under the conditions determined in step S61 (or steps S56, S75 and S77) at step S69. After the exposure is completed, the light emitter 12 is moved down to the retracted position, if the light emitter 12 is in the operative position (step S71).

If, for some reason, the light emitter 12 is not moved to the operative position at step S65, so that the upward movement detecting switch SW4 is OFF control proceeds to step S73 from step S67.

At step S73, it is determined, whether the external strobe is attached. If no external strobe is attached, the light emission of the incorporated strobe is prohibited and the shutter speed upon releasing is set to be identical to the calculated shutter speed, so that the exposure is performed without emitting the strobe light (steps S77 and S69). On the other hand, if the external strobe is attached, the external strobe emits the strobe light after the light emission of the incorporated strobe is prohibited and after the shutter speed upon releasing is set to be identical to the strobe synchronous speed to perform the exposure (steps S75 and S69).

Upon completion of the exposure, the light emitter 12 is moved down to the retracted position, if the light emitter is in the operative position (step S71).

As can be seen from the above discussion, according to the present invention, the permission of the emission of the strobe light is determined in accordance with the object brightness and the lens data. When strobe light emission is necessary, the light emitter 12 is automatically moved up to the operative position to emit the strobe light upon exposure when the release switch SWR is turned ON at the normal photographing position or immediately before the exposure at the self timer operation mode. Consequently, the light emitter 12 does not move to the operative position only by the operation of the photometer switch SWS. Accordingly, the problem of the troublesome operation in the prior art mentioned above can be solved. Furthermore, there is no offensive sound since the noise which is produced when the light emitter 12 moves upward is mixed with the sound of the release operation and is diluted thereby.

Furthermore, since the AF process is performed after the set time of the self timer is up at the self timer photographing mode, more accurate focusing can be expected by the AF process immediately before the exposure. In the addition, since the photometering process is performed during the focusing operation, a picture can be taken at an optimum exposure in accordance with the object brightness immediately before the exposure.

Furthermore, at the self timer photographing mode, since it is determined whether the strobe should used, in accordance with the result of the photometering operation prior to the release operation, so that the light emitter 12 is moved to the operative position for the strobe photographing if necessary, a more accurate exposure value can be obtained.

FIG. 5 shows a subroutine of the indicating operation. If the light emitter 12 is not in the operative position, if the external strobe 25 is not adaptable to the associated camera, and if the attached, lens is not appropriate, a warning indicator is activated (steps S81~S87). The determination that the light emitter 12 is not in the operative position is effected in accordance with the detection of the upward movement detecting switch SW4, as mentioned before. At the indication subroutine, the above-mentioned four light emission modes of the strobe and the set data of the camera are indicated at step S89. The indication makes it possible for an operator or a photographer to visibly determine whether the used strobe is appropriate or whether the external strobe or the incorporated strobe should be used, etc.

As can be understood from the above discussions, in an automatic focusing single lens reflex camera having a strobe incorporated therein according to the present invention, since the light emitter is moved to the operative position only after the release switch is turned ON at a normal photographing position, the number of upward and downward movements of the light emitter can be reduced, resulting in less troublesome operation and an improved handling of the camera, due to the maintenance of the light emitter in the retracted position when no release switch is turned ON.

At the self timer photographing mode, since it is determined immediately before the release operation whether the strobe should be used to perform the exposure, a picture can be taken at a more accurate exposure value.

The present invention is not limited to the above-mentioned embodiments. For instance, if a focus lock is required for a specific object at the commencement of the self timer photographing, it is possible to switch the mode to a mode in which the AF process (memorization of the amount of defocus) at the commencement of the self timer operation. The AF process and the photometering operation can be commenced in the self timer photographing when the set time of the self timer is up. The timings of the commencement of the AF process and the photometering operation are optional. Furthermore, if the AF process and the photometering operation are commenced in such a way that the exposure starts when the set time is up, a photographer (or object) can exactly learn the exposure time.

I claim:

1. A strobe incorporated camera having a strobe light emitter which emits strobe light, a light emitter driving mechanism which moves said light emitter between a retracted position in which said light emitter is retracted in a camera body and an operative position in which said light emitter emits said strobe light, a photometering means for obtaining an exposure factor when a first switch is turned ON, and an exposure means for conducting an exposure operation when a second switch is turned ON, said camera comprising:

means for judging whether said strobe light emitter should be used, in accordance with said exposure factor obtained by said photometering means; and means for controlling said light emitter driving mechanism to move said strobe light emitter to said operative position when said judging means judges that said strobe should be used and said second switch is turned ON.

2. A strobe incorporated camera according to claim 1, wherein said camera has a normal photographing mode and a self timer photographing mode.

3. A strobe incorporated camera according to claim 1, wherein said means for controlling said light driving mechanism to move said strobe light emitter to said operative position when said strobe judging means determines that said strobe light emitter should be used is operable when said first switch is turned ON.

4. A strobe incorporated camera according to claim 1, further comprising a release button associated with said camera body in association with said first switch and said second switch, so that when said release button is depressed halfway, said first switch is turned ON, and when said release button is fully depressed, said second switch is turned ON, respectively.

5. A strobe incorporated camera according to claim 2, wherein said photometering means operates to calculate said exposure factor immediately before an exposure operation and after a self timer operation starts in said self timer photographing mode.

6. A strobe incorporated camera according to claim 5, wherein said strobe judging means determines whether said strobe light emitter should be used in accordance with said exposure factor in said self timer photographing mode.

7. A strobe incorporated camera according to claim 6, wherein said light emitter driving mechanism controlling means further operates to control said light emitter driving mechanism to move said strobe light emitter to said operative position when said strobe judging means determines that said strobe light emitter should be used in said self timer photographing mode.

8. A strobe incorporated camera according to claim 7, wherein said light emitting driving mechanism operates to move said strobe light emitter to said operative position when said strobe judging means determines that said strobe light emitter should be used and said second switch is turned ON when said camera is in said normal photographing mode.

9. A strobe incorporated camera according to claim 1, further comprising means for effecting a compulsive light emitting operation that causes said light emitter driving mechanism controlling means to move said strobe light emitter to said operative position, regardless of said exposure factor obtained by said photometering means.

10. A strobe incorporated camera according to claim 9, further comprising means for indicating a use of said strobe light emitter when said strobe judging means determines that said strobe light emitter should be used.

11. A strobe incorporated camera having a strobe light emitter which emits strobe light, a light emitter driving mechanism which moves said strobe light emitter between a retracted position in which said strobe lighter emitter is retracted in a camera body and an operative position in which said strobe light emitter emits said strobe light, a photometering means for obtaining an exposure factor when a first switch is turned ON, and an exposure control means for performing a predetermined exposure when a second switch is turned ON, said camera comprising:

means for judging whether said strobe light emitter should be used, in accordance with said exposure factor obtained by said photometering means;

means for controlling said light emitter driving mechanism to move said strobe light emitter to said operative position when said strobe judging means determines that said strobe light emitter should be used and said second switch is turned ON;

a self timer photographing mode;

an automatic focusing device; and an automatic focus control means for controlling said automatic focusing device.

12. A strobe incorporated camera according to claim 11, wherein said automatic focus control means actuates said automatic focusing device to perform a focusing operation before said predetermined exposure is performed and after a self time operation is started when said camera is in said self timer photographing mode.

13. A strobe incorporated according to claim 11, wherein said automatic focus control means actuates said photometering means and said automatic focusing device before said predetermined exposure is performed and after a self time operation starts when said camera is in said self timer photographing mode.

14. A strobe incorporated camera according to claim 13, wherein said strobe light emitter comprises an auxiliary light emitting member for emitting auxiliary strobe light towards an object to be photographed and wherein said exposure control means operates said photometering means to obtain said exposure factor before said predetermined exposure after said self timer operation commences.

15. A strobe incorporated camera according to claim 13, wherein said strobe judging means determines whether said strobe light emitter should be used in accordance with said exposure factor, wherein said light emitter driving mechanism controlling means actuates said automatic focusing device after said strobe light emitter is moved to said operative position and an auxiliary light emitting means emits auxiliary strobe light, when said strobe judging means determines that said strobe light emitter should be used.

16. A strobe incorporated camera having a strobe light emitter which emits strobe light, a light emitter driving mechanism which moves said strobe light emitter between a retracted position in which said strobe light emitter is retracted in a camera body and an operative position in which said strobe light emitter emits said strobe light, a photometering means for obtaining an exposure factor when a first switch is turned ON, and an exposure means for performing a predetermined exposure when a second switch is turned ON, said camera comprising:

a hot shoe to which an external strobe can be detachably attached;

means for judging whether said strobe light emitter should be used, in accordance with said exposure factor obtained by said photometering means, and whether an external strobe, when attached to said hot shoe, interferes with said movement of said strobe light emitter to said operative position;

means for controlling said light emitter driving mechanism to move said strobe light emitter to said operative position when said strobe judging means determines that said strobe light emitter should be used and said second switch is turned ON.

17. A strobe incorporated camera according to claim 16, further comprising means for indicating interference when said strobe judging means determines that said external strobe interferes with said movement of said strobe light emitter.

18. A camera having an automatically operating built-in strobe, comprising:

means for obtaining an exposure factor when a first switch is activated;

means for performing an exposure operation when a second switch activated;

means for determining whether said built-in strobe should be used to illuminate an area that is to be photographed, based upon said exposure factor obtained by said exposure factor obtaining means; and means for moving said built-in strobe from an accommodated position, in which said built-in strobe is retracted into a portion of said camera, to an operative position, in which said built-in strobe can emit strobe light, in response to an activation of said second switch and a determination of said determining means that said built-in strobe should be used.

19. The camera of claim 18, further comprising:

means for effecting a compulsive light emitting operation that causes said built-in strobe to be moved to said operative position, regardless of said exposure factor obtained by said photometering means.

20. The camera of claim 18, further comprising:

means for selectively attaching an external strobe to said camera;

means for determining whether said selectively attached external strobe interferes with said moving of said built-in strobe to said operative position; and means for indicating whether said selectively attached external strobe interferes with said moving of said built-in strobe to said operative position.

*21. A strobe incorporated camera having a strobe light emitter which emits strobe light, a light emitter driving mechanism which moves said strobe light emitter between a retracted position in which said strobe light emitter is retracted in a camera body and an operative position in which said strobe light emitter emits said strobe light, and an exposure control means for performing a predetermined exposure when a switch is turned ON, said camera comprising:*

*means for judging whether said strobe light emitter should be used;*

*means for controlling said light emitter driving mechanism to move said strobe light emitter to said operative position when said strobe judging means determines that said strobe light emitter should be used and said switch is turned ON;*

*a self timer photographing mode;*

*an automatic focusing device; and*

*an automatic focus control means for controlling said automatic focusing device.*

*22. The strobe incorporated camera of claim 21, further comprising a photometering device that obtains an exposure factor.*

*23. The strobe incorporated camera of claim 22, wherein said automatic focus control means actuates said photometering device and said automatic focusing device before said predetermined exposure is performed and after a self timer operation starts when said camera is in said self timer photographing mode.*

*24. The strobe incorporated camera of claim 23, wherein said strobe light emitter comprises an auxiliary light emitting member for emitting auxiliary strobe light towards an object to be photographed, and wherein said exposure control means operates said photometering means to obtain said exposure factor before said predetermined exposure after said self timer operation commences.*

*25. The strobe incorporated camera of claim 23, wherein said strobe judging means determines whether said strobe light emitter should be used in accordance with said exposure factor, said light emitter driving mechanism controlling means actuating said automatic focusing device after said strobe light emitter is moved to said operative position and an auxiliary light emitting means emits auxiliary strobe light when said strobe judging means determines that said strobe light emitter should be used.*

*26. A camera, comprising:*

*a self-timer photographing mode in which an exposure operation is performed a predetermined period of time after a release switch of said camera is activated;*

*an object distance detector unit that performs a focus operation to obtain an in-focus condition of a lens of said camera upon a substantial passage of said predetermined period of time after said release switch is actuated when said camera is set to said self-timer photographing mode;*

*a strobe light emitter for providing auxiliary light when a calculated shutter speed is below a predetermined value; and*

*means for driving said strobe light emitter between a retracted position in which said strobe light emitter is retracted into said camera, and an operative position in which said strobe light emitter emits said strobe light, wherein said strobe light emitter is driven to said operative position just prior to said object distance detector unit performing said focus operation to obtain said in-focus condition.*

* * * * *

UNITED STATES PATENT AND TRADEMARK OFFICE

CERTIFICATE OF CORRECTION

PATENT NO. : Re. 35,415

DATED : December 31, 1996

INVENTOR(S) : Satoshi TAKAMI

It is certified that error appears in the above-indentified patent and that said Letters Patent is hereby corrected as shown below:

On the cover page, in section [54], the title, line 2, "OPERATED" should be changed to ---OPERATING---.

Signed and Sealed this

Twenty-second Day of July, 1997

Bruce Lehman

*Attest:*

BRUCE LEHMAN

*Attesting Officer*

*Commissioner of Patents and Trademarks*